United States Patent Office 3,712,827
Patented Jan. 23, 1973

3,712,827
RADIOGRAPHIC SCREEN
Eugene Patrick Gramza, Rochester, N.Y., assignor to Eastman Kodak Company, Rochester, N.Y.
No Drawing. Filed Oct. 21, 1969, Ser. No. 868,234
Int. Cl. B32b 27/08; G03c 1/92
U.S. Cl. 117—33.5 R
4 Claims

ABSTRACT OF THE DISCLOSURE

Improved inorganic phosphor screens comprising a support bearing a layer comprising a binder of a polycarbonate polymer are described for radiographic use. Said screens exhibit improved image sharpness in combination with radiographic films.

BACKGROUND OF THE INVENTION

Field of the invention

This invention relates to fluorescent screens alone and in combination with image forming elements. In one aspect this invention relates to an X-ray intensifying screen having improved physical properties and improved light intensifying characteristics. In still another aspect, this invention relates to screens containing a solvent insoluble, particulate inorganic phosphor wherein the binding agent for said insoluble phosphor particles is composed of a high molecular weight polycarbonate.

Description of the prior art

In the manufacture of intensifying screens, a phosphor, i.e. a substance which emits light upon radiation, is dispersed in a suitable binder in a variety of ways and in various and usually high ratios depending in part upon the internal reflecting nature of the binder and the efficiency of the phosphor, particularly when so dispersed. One purpose of using high phosphor-to-binder ratios is to ensure maximum screen brightness in an effort to obtain increased speed, improved image definition, and improved mottle characteristics.

It is known to use certain film-forming high polymers such as polystyrene, poly(vinyl toluene), and polyesters such as polycarbonates, as binder materials such as disclosed in U.S. Pat. 3,282,697 issued Nov. 1, 1966, to Blank et al. However, the light intensifying effect produced therein was achieved only by selecting and using those limited organic fluorescent substances which were capable of being added in dissolved form to the organic binder. While the chemical structure of the organic fluorescent substance is not particularly critical for that invention, it could not have been obvious therefrom that such binders could be used in combination with insoluble inorganic phosphors, such as is disclosed hereafter.

In addition, screen binders used heretofore become badly discolored upon aging and continued use and, in addition, are particularly susceptible to changes in humidity and temperature.

It is evident, therefore, that improved radiographic screens whose binders provide improved physical characteristics which permit repeated use and provide increased image sharpness in a radiographic element will greatly enhance the radiographic art.

SUMMARY OF THE INVENTION

In accordance with this invention, I have provided an improved fluorescent screen comprising an inorganic phosphor dispersed in a synthetic film-forming, high molecular weight, polycarbonate polymer resin.

It is an object of the present invention to provide improved radiographic intensifying screens alone and in combination with radiographic image forming elements.

It is another object of the present invention to provide improved intensifying screens possessing improved physical characteristics including increased flexibility and dimensional stability.

It is still another object of the present invention to provide improved screens having high molecular weight polycarbonate polymeric binders which, when used with inorganic heavy metal ion-containing phosphors, provide improved image sharpness in a radiographic element, and particularly a silver halide containing element.

Other objects of this invention will become apparent to those skilled in the art from an examination of the specification and claims which follow.

DESCRIPTION OF THE PREFERRED EMBODIMENTS

In accordance with my invention, the above and other objects are attained using a fluorescent intensifying screen comprising a support bearing a layer comprising an inorganic metal ion-containing phosphor dispersed in a linear, high molecular weight film-forming polycarbonate polymer comprising recurring units of the formula:

$$\left[ -O-R-\underset{\underset{R_5}{|}}{\overset{\overset{R_4}{|}}{C}}-R-O-\overset{O}{\overset{\|}{C}}- \right]$$

wherein:

Each R is a phenylene radical including halo substituted phenylene radicals and alkyl substituted phenylene radicals.

$R_4$ and $R_5$, when taken separately, can each be a hydrogen atom, and aryl or an alkyl radical. Suitable alkyl radicals include those containing from 1 to 10 carbon atoms such as methyl, ethyl, propyl, isopropyl, butyl, tertiary butyl, pentyl, hexyl, heptyl, octyl, nonyl, decyl and the like including substituted alkyl radicals such as trifluoromethyl, and the like. Aryl radical examples include those such as phenyl and naphthyl including substituted aryl radicals having such substituents as a halogen atom, alkyl radicals containing from 1 to 5 carbon atoms, and the like. In addition, $R_4$ and $R_5$, when taken together, can represent the carbon atoms necessary to form a cyclic hydrocarbon radical including cycloalkanes such as cyclohexyl and polycycloalkanes such as norbornyl, the total number of carbon atoms in $R_4$ and $R_5$ being up to 19.

In a preferred embodiment, the inorganic phosphor is dispersed in said layer and preferably in the form of finely divided particles.

In another embodiment, the dispersed phosphor is a salt of a heavy metal from Group II of the Periodic Table (Lange's Handbook of Chemistry, 10th Edition, 1967, pp. 58–61). Exemplary of said phosphors are calcium tungstate, (barium, lead) sulfate, zinc sulfide, (zinc, cadmium) sulfide, zinc orthosilicate and the like.

The radiographic screens of my invention can be constructed such that they are either non-integral, i.e. separate, or they can be integral, i.e. supported by an element comprising a silver halide emulsion with the intensifying screen in combination therewith. Because of their improved composition, the screens useful in the practice of this invention do not discolor as seriously as do presently known screens, either during preparation or in use. Further, these improved screens exhibit significantly increased flexibility and dimensional stability even with repeated use and with changes in temperature and humidity and other conditions to which screens are normally exposed.

Solvents useful for preparing coating compositions for the screen binders of the present invention can include a wide variety of organic solvents for the components of said compositions, for example, benzene, toluene, acetone, 2-butanone and particularly the chlorinated hydrocarbons such as methylene chloride, ethylene chloride and the like and ethers such as tetrahydrofuran. Mixtures of these solvents can also be used advantageously in the practice of this invention.

A wide range of viscosities of the polycarbonate resin dispersions useful in preparing these screens can be effectively employed, such as for example, viscosities from about 1,000 to about 5,000 cps. Said dispersions are subsequently dried down after coating as will be easily understood by those skilled in the art. A particularly useful range exists between about 1,500 to about 4,000 cps. When a dispersion having a particularly low viscosity is employed, surface defects appear as reticulations, or so-called "orange peel" textures. Conversely, when the use of compositions having undesirably high viscosities is attempted, great difficulty in coating arises, often resulting in streaks or bands.

While the efficiency of the intensifying screen depends in part upon the concentration, i.e. the ratio of phosphor to binder, I have found that substantial latitude in concentration exists without sacrificing sharpness. The polycarbonates useful in the practice of my invention and methods for their production are described in a variety of patents, such as for example British Pats. 772,627; 808,-485; 808,486; 808,488; 808,490; 808,629; 809,735; 853,-587; 853,588 and others.

The radiographic intensifying screen can emit in a wide spectral range and, depending upon the particular phosphor employed, can have a substantial part, that is, more than half, of its total spectral emission at a wavelength shorter than about 410 nm. This emission falls in a substantial part in the ultraviolet range of the spectrum and I have found that certain inorganic heavy metal ion-containing phosphors are particularly useful therefor. Such phosphors have a physical density greater than at least about 3.5 gm./cm.$^3$ and preferably greater than 3.9 gm./cm.$^3$. However, I have produced particularly effective novel screens in the practice of my invention by using phosphors containing ions of heavy metals, including those made from the lanthanide group of the periodic table. The latter rare earth elements have an atomic number in the range between 57 to 71 and include lanthanum, cerium, samarium, europium, gadolinium and the like. Particularly effective heavy metal ion-containing phosphors are those selected from the group consisting of lead sulfate, lanthanide- or lead-activated $BaSO_4$, lead-activated barium silicate, gadolinium-activated yttrium oxide, lanthanide or lead-activated strontium sulfate, or various mixed alkaline earth phosphors such as barium-strontium sulfate and the like where the lanthanide activator has more than half its emission in the ultraviolet region, and barium fluoride, barium fluoride chloride and the like. Said phosphors can be prepared by a number of ways, such as set forth in Belgian Pat. 703,998 issued Mar 18, 1968, to Luckey, in Buchanan et al., J. Applied Physics, vol. 39, pp. 4342–4347 (1968) and in Clapp and Ginther, J. Opt. Soc. of Amer., vol. 37, No. J, pp. 355–362 (1947). I have found that satisfactory results are achieved equally well using phosphors which likewise have their emission peak in the near ultraviolet or ultraviolet regions, that is, about 400 nm. or less. (Barium, lead) sulfate is such an example, since it emits in both the blue and ultraviolet regions but peaks in the near ultraviolet at about 370 nm. Calcium tungstate, although it emits only a minor portion in the ultraviolet region and peaks in the blue region, is equally effective when combined in the binder disclosed herein. Further, by various processing means, such as grinding, bombarding, fluid energy processing and the like, desirable phosphor particle sizes and configurations are obtained. A preferred average microscopic size for the phosphor, and particularly for the lead activated barium sulfate is from about 0.1 to about 30$\mu$ and a particularly useful range is from about 1 to about 15$\mu$ in which case about 80% of the particles fall within an average size range of about 8–9 microns. Consequently, the X-ray intensifying screens used in my combinations are comprised of phosphors which have various particle sizes and, which preferably substantially emit at wavelengths even less than about 380 nm. The improved fluorescent intensifying screens which form my invention comprise a phosphor or combinations thereof which can be dispersed or suspended in a suitable binder such as set forth hereafter. This binder can be further characterized as being a coherent film-forming macromolecular polymeric binder which forms a continuous phase after casting and contains the phosphor dispersed therein. The phosphors can be present in the binder in an unexpectedly wide range of concentrations such as, for example, at a pigment to binder ratio of from about 10:1 to about 2:1 and preferably in the range from about 4:1 to about 8:1. The coverage of said phosphor is particularly effective in the screen in a wide coating range from about 15 to about 35 grams/ft.$^2$ and preferably at about 16 to about 20 grams/ft.$^2$ while still maintaining the physical characteristics required. Likewise the manner in which these screens can be coated is effective in a variety of ways such as directly over the photographic layer or on both sides of a duplitized or single coated element. Intermediate layers, protective or overcoat layers, can likewise be employed between the support and the phosphor layer or over the phosphor layer comprising the intensifying screen. Said intermediate layers, protective or overcoat layers can comprise hydrophilic colloid material such as gelatin, gelatin derivatives, cellulose esters, alkyl acrylate-containing polymers and the like and, in addition, said layers can be opaque or substantially transparent in order to provide optimum speed, sharpness and mottle.

Suitable supports for the screens are those having various desirable physical and chemical properties. For example, the support should permit its ready passage through a rapid automatic processor in those cases where the screen is integral, and in another aspect can be either ultraviolet or non-ultraviolet absorbing. These and still other properties are all important in determining suitable supports. Said support should, therefore, be reasonably flexible and preferably transparent to radiation, but able to maintain the dimensional stability and integrity of the various coatings thereon. Typical screen supports are cellulose esters, such as cellulose nitrate or cellulose acetate, poly(vinyl acetal), polystyrene, poly(ethylene terephthalate), other polyesters, and the like. Supports such as cards or paper which are coated with alpha-olefin polymers, particularly polymers of alpha-olefins containing two or more carbon atoms, as exemplified by polyethylene, polypropylene, ethylene-butylene copolymers and the like can be used.

The image recording element so described preferably comprises double coated silver halide coatings borne by a suitable support but single coatings are also suitably used. The silver halide can comprise varying amounts of silver chloride, silver iodide, silver bromide, silver chlorobromide, silver bromoiodide and the like. Particularly good results are obtained with silver bromoiodide emulsions in which the average grain size of the silver bromoiodide grains is in the range of about 0.5 to about 5 microns and preferably in the range of about 0.5 to about 1.6 microns.

The silver halide coatings can contain any of the hydrophilic, water permeable binding materials suitable for this purpose. Such suitable materials include gelatin, colloidal albumen, polyvinyl compounds, cellulose derivatives, acrylamide polymers and the like alone or in combination and mixture. The binding agents for the emulsion layer of the photographic element can also contain dispersed polymerized vinyl compounds. Certain of these compounds are disclosed for example in U.S. Pats. 3,142,-568 of Nottorf issued July 28, 1964; 3,193,386 of White issued July 6, 1965; 3,062,672 of Houck et al. issued November 1962; and 3,220,844 of Houck et al. issued Nov. 30, 1965, and include the water insoluble polymers and latex copolymers of alkyl acrylates and methacrylates, acrylic acid sulfoalkylacrylates or methacrylates and the like.

Each of these photographic silver halide coatings generally comprises silver in the range of about 275 to about 625 mg. of silver per square foot but good results are obtained using coverages having a range of about 300 to about 450 mg. per square foot.

The silver halide layers can also contain certain additives, particularly those known to be beneficial in such layers. For example, they can contain speed increasing compounds, such as the onium salts like quaternary or ternary, e.g. sulfonium salts, polyalkylene glycols, thioethers and the like. The photographic silver halide dual coatings can be stabilized with mercury compounds, azaindenes, quaternary benzothiazolium compounds, hydroxy substituted aromatic compounds, and the like.

The photographic silver halide emulsions or coatings disclosed herein can also contain non-ionic, anionic and/or amphoteric coating aids. Some useful coating aids include, for example, saponin, alkyl substituted aryl oxy alkylene ethyl sulfonates of the type described in U.S. Pat. 2,600,831, issued June 17, 1952, maleopimarates of the type described in U.S. Pat. 2,823,123 issued Feb. 11, 1958, taurine derivatives of the type described in U.S. Pat. 2,739,891 issued Mar. 27, 1956 and alkyl aminopropionates of the type described in U.S. Pat. 3,133,816 issued May 19, 1964. Typical of still other coating aids and surfactants which can be employed in the emulsions of this invention include the alkyl phenoxy poly(glycidols) having from about 5 to about 12 glycidol units, for example such as those disclosed in British Pat. 1,022,878 issued Mar. 16, 1966 to Olin Mathieson.

These photographic emulsions and coatings can contain incorporated developing agents such as polyhydroxy benzenes, aminophenols and 1-aryl-3-pyrazolidones and the like. The photographic coatings and emulsions can also contain spectral sensitizers such as cyanines, merocyanines, styryls and hemicyanines.

In addition these silver halide radiographic emulsions and coatings can be chemically sensitized with compounds of the sulfur group, noble metal salts, such as gold salts, reduction sensitized with reducing agents and combinations of these. Furthermore, these sensitive layers and other layers present in the elements of this invention can be hardened with any suitable hardener or combinations such as aldehyde hardeners, aziridine hardeners, hardeners which are derivatives of dioxane, vinyl sulfones, oxypolysaccharides such as oxystarch, oxyplant gums, inorganic hardeners such as chromium salts and the like.

It will be understood by those skilled in the art that the radiographic image recording elements disclosed herein can be processed in a variety of ways, such as by use of the manual conventional multi-tank methods well known in the art and in the automatic processing systems disclosed in Belgain Pat. 700,301 issued Aug. 31, 1967 to Barnes, Rees and Wilt and by the methods disclosed in U.S. Pat. 3,232,761 issued Feb. 1, 1966 to Allen and Burness, for example. These elements comprise a support which is substantially transparent or lightly tinted and is reasonably flexible so as to permit both conventional processing utilizing a series of processing tanks and rapid access processing employing transport systems such as a mechanized roller transport system. Typical of said supports are cellulose nitrate film, cellulose ester film, polyvinyl acetal film, polystyrene, poly(ethylene terephthalate) film and other polyester film and the like. In a preferred embodiment the support comprises a linear condensation polymer of high molecular weight. One suitable polymer of this type is poly(ethylene terephthalate) which can be melt extruded to form bases of varying thicknesses as desired, e.g., in the range of about 1 to about 10 mils. Polymers of this type are often melt extruded at temperatures in the range of about 270° C. to about 305° C.

These linear polyester materials are linear polyesters of at least one glycol having 2 to 10 carbon atoms and at least one dibasic acid comprising at least 50 mole percent of an acid having two carboxyl radicals attached to a carbocyclic nucleus having from 4 to 6 carbon atoms per ring, said ester having a number average molecular weight of 10,000 to about 100,000, an inherent viscosity in a mixture of 60% phenol and 40% tetrachloroethane of at least 0.3 and melting at from about 175° to about 350° C.

In addition, various ultraviolet and visible light absorbing materials can be employed in the practice of this invention provided they possess the characteristics of solvent stability, and compatibility with other absorbing materials possessing similar characteristics, in order that they can be used alone or in combination therewith. In addition, the ultraviolet absorbing compounds employed in the practice of this invention are non-proteinaceous and possess little or no absorbing capability in the visible range of the electromagnetic spectrum. This means that the absorbers are most effective at wavelengths of about 410 nm. or less. It is equally important that these ultraviolet, non-fluorescing absorbers be essentially non-color imparting in order to obviate extensive leaching or bleaching processes as are required for fugitive type and sometimes pigmented absorbers.

The following examples are included for a further understanding of the invention.

Example I

The phosphor-containing dispersion is prepared by adding the following components to a Waring Blendor and mixed at its highest speed, i.e. 18,00 r.p.m. for a period of about 20 minutes:

| | Grams |
|---|---|
| $BaSO_4$:lead activated | 499.9 |
| Bisphenol A polycarbonate (Lexan 105, a trademark of the General Electric Company) | 61.1 |
| 1,2-dichloroethane | 337.5 |
| 1,1,2-trichloroethane | 112.5 |

(This ratio of phosphor to binder is about 8.2:1.)

The percentage solids is 55%, the specific gravity 2.2 and the viscosity 3,500 cps. The latter two determinations are made by use of accepted methods and devices well known in the art.

The resulting dispersion is machine coated upon a flexible 4 mil thick poly(ethylene terephthalate) support at a coating weight sufficient to produce a dried weight of dispersion of 20–25 grams/ft.$^2$.

Example II

In a similar manner other dispersions are obtained in which the pigment-to-binder ratios are about 6:1 and 4:1.

In order to determine the relative sharpness of the image produced on a radiographic sensitive film element, the intensifying screens described above of varying pigment to binder ratios are used in combination with an integral duplitized image forming film. Each film layer is coated at a thickness of 425 mg. of silver per ft.$^2$. After the object to be recorded is exposed to a 30 kv. radiation source through a 0.5 mm. copper filter, the element is processed and the image sharpness recorded as shown in Table I. Processing is effected in this instance by employing an unidirectional high speed roller system apparatus of the type described in Belgian Pat. 700,301 issued Aug. 31, 1967. This apparatus is commercially available under the name of R.P. X-OMAT, a trademark of the Eastman Kodak Company.

While good results are obtained such as those set forth hereafter for said double coated films, equally good results in obtaining image sharpness are demonstrated with single coated films, and non-integral film-screen combinations. Equally good results are obtained using conventional or manual processing methods.

TABLE I

| Binder | Ratio of (BaSO₄:Pb) pigment to binder | Coating weight, grams/ft.² | Radiographic characteristics | |
|---|---|---|---|---|
| | | | Relative speed | Relative sharpness |
| Lexan | 4:1 | 17.0 | 80 | Slightly better than control. |
| | 6:1 | 19.5 | 80 | Better than control. |
| | 8:1 | 18.5 | 80 | Do. |

The control against which the above sharpness values are compared is a commercially available screen ("Par Speed," a registered trademark of E. I. du Pont de Nemours & Co., Inc.) comprising calcium tungstate in a poly(vinyl butyral) binder.

Similarly, when the phosphor binders of this invention are prepared as in Example I and compared to other commercially available screen binders as controls, increased speed and image sharpness are again obtained as shown hereafter in Table II.

TABLE II

| Screen binder | Pigment:binder ratio (BaSO₄:Pb) | Coating weight (grams/ft.²) | Relative speed (100) | Relative sharpness |
|---|---|---|---|---|
| "Lucite 44" ¹ | 8:1 | 21.5 | 90 | Very poor. |
| "Butvar B-76" ² | 8:1 | 21.0 | 80 | Do. |
| "Lexan 105" | 8:1 | 25.0 | 100 | Slightly better than control. |
| | 8:1 | 27.0 | 115 | Do. |

¹ A trademark of the E. I. duPont de Nemours and Co. for its normal butyl methacrylate polymer.
² A trademark of the Monsanto Company, Plastic Products and Resins Division, Springfield, Mass., for its poly(vinyl butyral).

In addition, similarly good results are obtained when the above screens are used in various combinations with radiographic elements containing a support, a silver bromoiodide emulsion layer in which said iodide comprises up to about 10 mole percent of the halide, and an arrangement of distinct layers wherein said X-ray intensifying screen and a conversion material are disposed between the support and the emulsion layer.

As shown above, the X-ray intensifying screen emits radiation in the violet to near ultraviolet region of the electromagnetic spectrum upon exposure to X-rays, which emitted radiation the conversion material is capable of converting to radiation of longer wave lengths in the range of about 400 to about 560 mµ with a resulting improvement in contrast.

Materials which convert the normal radiation emission of (barium, lead) sulfate in the X-ray intensifying screen to radiation of longer wave lengths can include organic or inorganic substances or mixtures thereof, such as, for example, a combination of terphenyl and 1,4-bis-[2-(5-phenyloxazolyl)]benzene, a combination of 1,1,4,4-tetraphenyl butadiene and 1,4-bis[2-(5-phenyloxazolyl)] benzene, or zinc sulfide.

Radiographic elements improved as described can be chemically sensitized, e.g., with noble metal sensitizers alone or in combination with sulfur or selenium sensitizers. They can contain antifoggants, hardeners, plasticizers, development modifiers, coating aids and other suitable photographic addenda, such as described in U.S. Pat. 3,297,446 (Columns 4-9).

Similarly, extraordinary image sharpness is achieved by employing the above described polycarbonate binders in an integral screen combination with a duplitized radiographic film comprising (1) a central layer of phosphor dispersed in a clear resin binder such as poly(ethyl acrylate), poly(vinyl acetate), silicone alkyds, urea formaldehyde and the like disposed between sheets of transparent thin film support material, and (2) photosensitive silver halide layers coated over and on opposite sides of the film support.

The invention has been described in detail with particular reference to certain preferred embodiments thereof, but it will be understood that variations and modifications can be effected within the spirit and scope of the invention.

I claim:

1. A fluorescent screen comprising a support bearing a coating comprising a phosphor which is a salt of a heavy metal from Group II of the Periodic Table, or a heavy metal ion from the lanthanide group of the Periodic Table, dispersed in a linear, high molecule weight film-forming polycarbonate polymer binder comprising recurring units of the formula

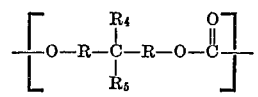

wherein:

each R is a phenylene radical, and $R_4$ and $R_5$, when taken separately, are each hydrogen, an alkyl radical, or an aryl radical; or when taken together $R_4$ and $R_5$ can represent the atoms necessary to form a cyclic hydrocarbon radical, the total number of carbon atoms in $R_4$ and $R_5$ being up to 19, said support being poly(ethylene terephthalate).

2. The screen of claim 1 in which said phosphor is dispersed as fine particles in said layer.

3. The screen of claim 1 in which said phosphor is calcium tungstate, (barium, lead) sulfate, zinc sulfide, (zinc, cadmium) sulfide or zinc orthosilicate.

4. The screen of claim 1 in which the film-forming polymer binder layer containing said phosphor is coated from a dispersion having a viscosity in the range from about 1,000 to about 5,000 cps.

References Cited

UNITED STATES PATENTS

| 2,292,914 | 8/1942 | Wesch | 252—301.4 |
| 2,791,565 | 5/1957 | Runciman | 252—301.4 |
| 2,807,725 | 9/1957 | Schwerin | 250—65 |
| 2,887,379 | 5/1959 | Blake et al. | 96—82 |
| 3,185,841 | 5/1965 | Land | 250—65 |
| 3,282,697 | 11/1966 | Blank et al. | 96—82 |
| 3,316,118 | 4/1967 | Landskroener | 96—82 |
| 3,366,573 | 1/1968 | Feuer | 252—301.4 |

FOREIGN PATENTS

| 853,587 | 11/1960 | Great Britain. |
| 853,588 | 11/1960 | Great Britain. |

OTHER REFERENCES

Anon., "Polycarbonates," British Plastics, vol. 31 #3, March 1958, pp. 112-114.

WILLARD E. HOAG, Primary Examiner

U.S. Cl. X.R.

96—82; 117—138.8 F, 161 K; 250—65 R, 65 F; 252—301.4